(12) United States Patent
Eigler

(10) Patent No.: US 8,087,792 B2
(45) Date of Patent: Jan. 3, 2012

(54) VARIABLE SIZED OPTICAL BEAM HOMOGENIZER AND METHOD

(75) Inventor: Lynne C. Eigler, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 787 days.

(21) Appl. No.: 12/129,398

(22) Filed: May 29, 2008

(65) Prior Publication Data

US 2009/0296243 A1  Dec. 3, 2009

(51) Int. Cl.
*G02B 5/08* (2006.01)

(52) U.S. Cl. ......................................... 359/861

(58) Field of Classification Search .................. 359/861, 359/850, 855–857
See application file for complete search history.

(56) References Cited

U.S. PATENT DOCUMENTS 2,995,997 A * 8/1961 Nieuwenhove ............... 359/731
5,367,444 A * 11/1994 Bornhorst et al. ............. 362/264

* cited by examiner

*Primary Examiner* — Euncha Cherry
(74) *Attorney, Agent, or Firm* — Haynes and Boone, LLP

(57) ABSTRACT

An optical beam homogenizer having an adjustable homogenizer chamber for selectively producing different sized homogenized output beams and related methods in accordance with one or more embodiments is described herein.

23 Claims, 16 Drawing Sheets

VARIABLE SIZED OPTICAL BEAM HOMOGENIZER AND METHOD

TECHNICAL FIELD

The present disclosure relates generally to light guides, and more particularly to a variable sized optical apparatus for receiving an optical beam and for producing different sized beam outputs.

BACKGROUND

Optical devices such as homogenizers typically receive one or more optical beams at an input, even out the irradiance (power/unit area) profiles of the light, and produce a single uniform optical beam at the output. In many optical testing and inspection applications a range of optical beam size outputs is desired or the required output beam size is not known a priori. However, the outputs of existing optical devices are fixed in size.

Currently, there are essentially two solutions to the problem of producing variable sized output beams from an optical device having a fixed output size. The first approach is to create a multitude of optical devices each having a specific fixed output size. Unfortunately, this approach is, among other things, time consuming, inefficient, and expensive as a new optical device must be built for every desired optical beam output size.

In the second approach, the output size of the optical device remains constant while the optical beam is resized using an aperture of an appropriate size to control beam size by clipping the edge of the beam at the output of the optical device; i.e., the aperture removes any light from the beam outside the desired beam size. However, in this approach, while the irradiance value (power per unit area) remains constant, the total power of the beam is decreased.

Furthermore, as the aperture can only reduce the beam size, the second approach does not lend itself if an increase in beam size is desired. If it is anticipated that a large beam might be needed at some point, then the optical device must be configured to accommodate the largest anticipated beam size. The irradiance in this large beam then becomes the maximum irradiance available for all smaller beam sizes. If higher irradiance values are desired for the smaller output beams, then, as indicated previously, a new optical device would need to be built.

Accordingly, there exists a need for a variable sized optical apparatus and method thereof for receiving one or more optical beams and for producing different sized substantially uniform beam outputs.

SUMMARY

The subject matter disclosed herein includes, an optical beam homogenizer having an adjustable homogenizer chamber for selectively producing different sized homogenized output beams.

An optical beam homogenizer comprises a reflective enclosure to receive an optical beam input, reflect the optical beam from an interior portion of the enclosure, and to produce an optical beam output, the enclosure including movable reflective panels that define the interior portion of the enclosure and move relative to each other to vary a size of the enclosure to produce the optical beam output from the enclosure.

A method for producing different sized optical beam outputs from an optical homogenizer in accordance with one embodiment includes receiving one or more optical beams into an interior portion of an enclosure of the homogenizer and varying the size of the enclosure to produce different size substantially uniform optical beams at the output.

These and other embodiments will become readily apparent to those skilled in the art from the following detailed description of the various embodiments having reference to the attached figures, the disclosure not being limited to any particular embodiment(s) disclosed.

DETAILED DESCRIPTION

Embodiments will now be described with references to the accompanying figures, wherein like reference numbers refer to like elements throughout. The terminology used in the description presented herein is not intended to be interpreted in any limited or restrictive manner, simply because it is being utilized in conjunction with a detailed description of certain embodiments. Furthermore, various embodiments (whether or not specifically described herein) may include novel features, no single one of which is solely responsible for its desirable attributes or which is essential to practicing the subject matter herein described.

The present disclosure relates generally to optical guides, and more particularly to a variable sized optical apparatus such as a homogenizer for receiving one or more optical beams and for producing different sized substantially uniform beam outputs.

In one embodiment, the optical apparatus may be utilized to even out the irradiance (power/unit area) profiles of light for testing and inspecting solar cells without the need for a specific homogenizer for each size solar cell. The optical apparatus described herein may be further utilized for testing and other purposes in a variety of applications including, but limited to solar arrays, charged-coupled device (CCD) arrays, focal plane arrays, and detectors. Ideally, the optical apparatus provides a uniform beam at the output and for a short distance beyond. Typically, the optical apparatus is used with other optics that focus the beam or with a beam that is already a 'point source'.

Figure 11A:
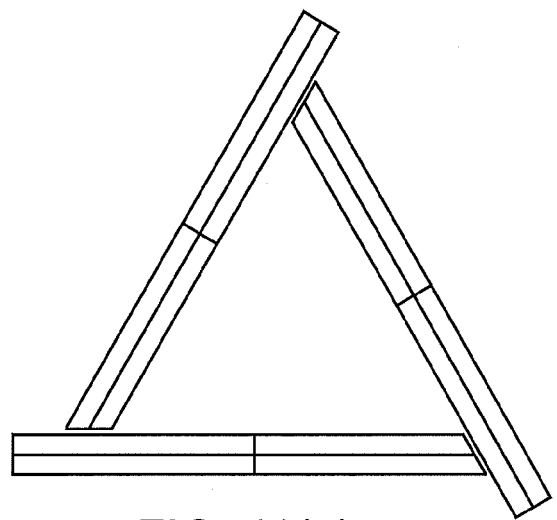
FIGS. 11(a)-11(c) shows various cross-sectional views of the variable sized optical apparatus in accordance with the various embodiments.
Figure 11B:
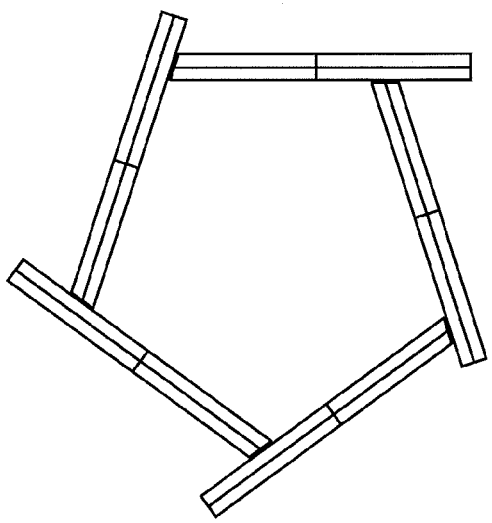
Figure 11C:
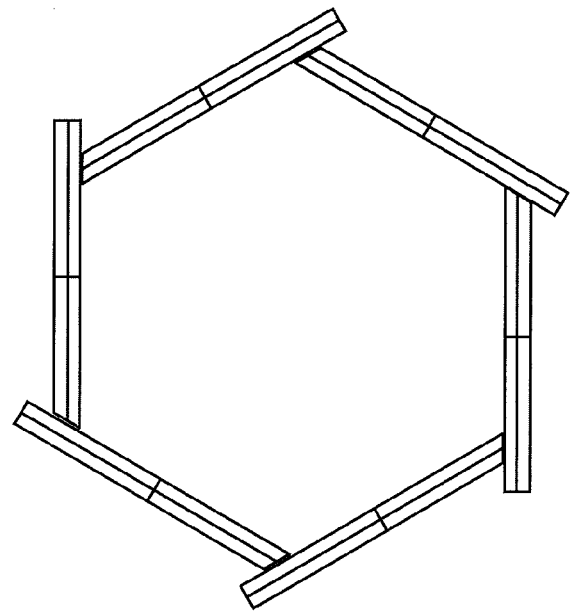
Figure 12A:
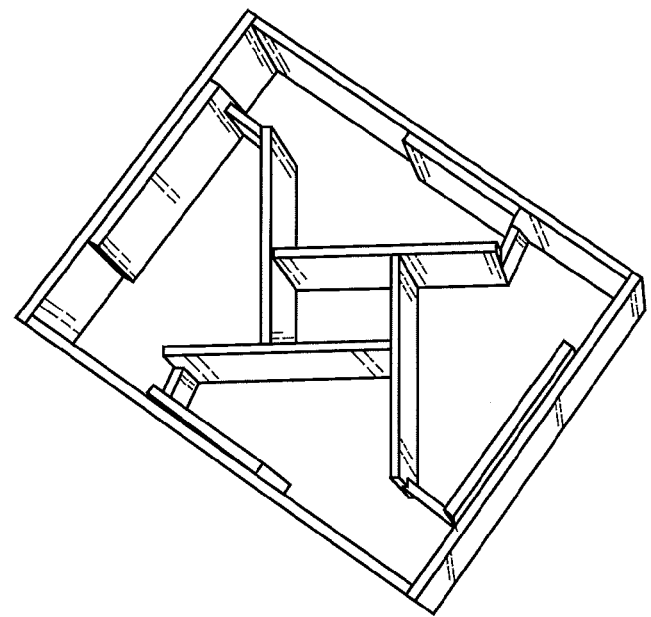
FIGS. 12(a)-(f) show various views of a variable optical apparatus in accordance with the subject matter described herein.
Figure 12B:
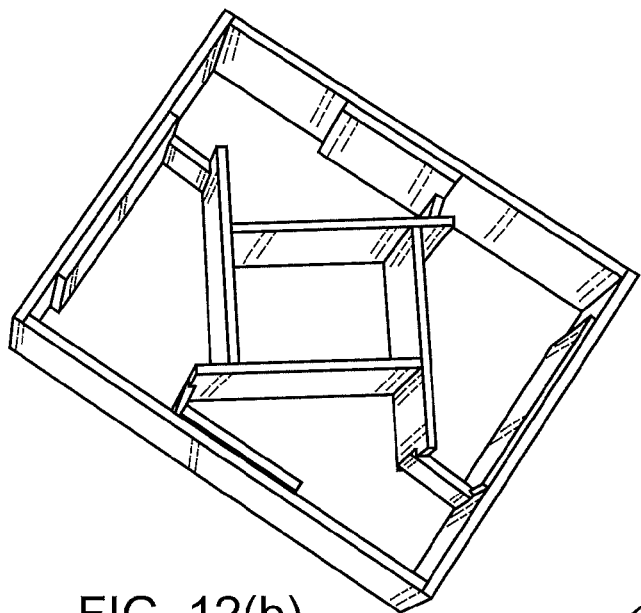
Figure 12C:
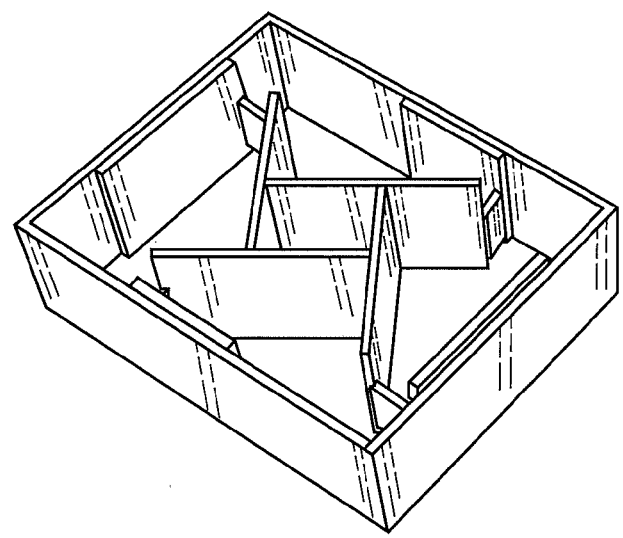
Figure 12D:
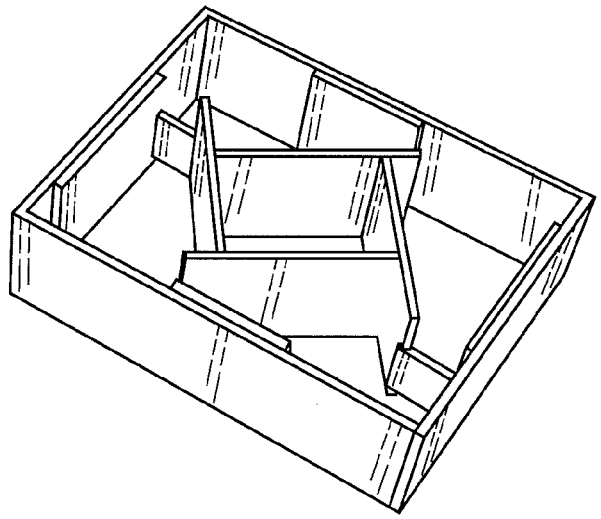
Figure 12E:
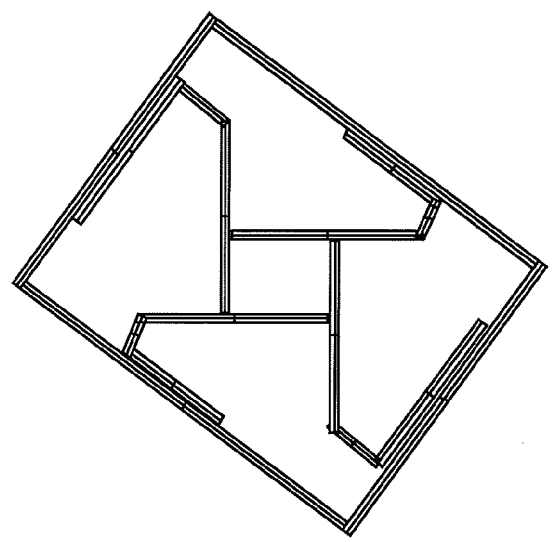
Figure 12F:
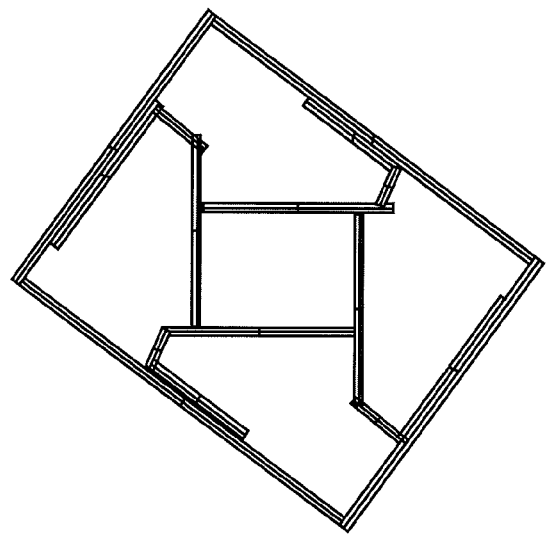
Figure 13A:
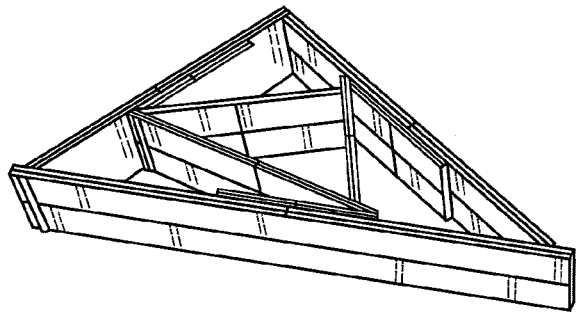
FIGS. 13(a)-(d) show various views of a non-regular polygon variable optical apparatus in accordance with the subject matter described herein
Figure 13B:
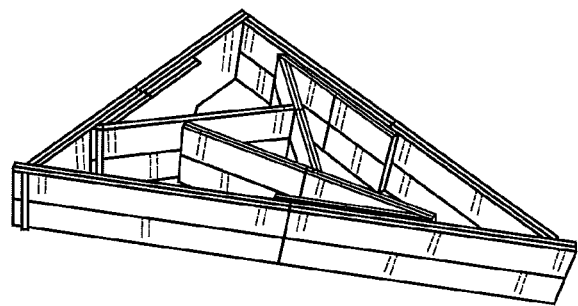
Figure 13C:
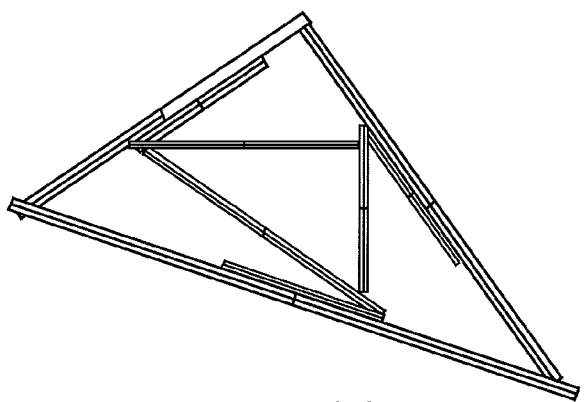
Figure 13D:
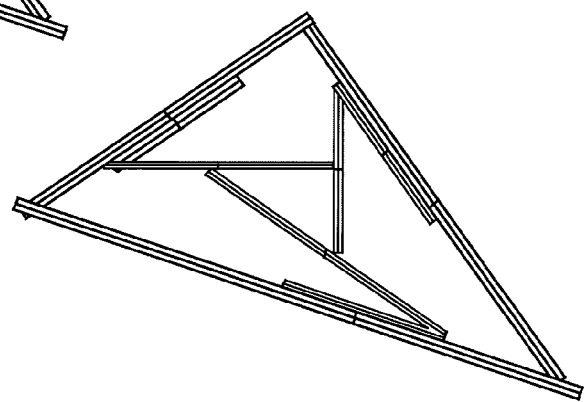

For convenience and simplicity, the optical apparatus disclosed herein is described as having a reflective enclosure defined or formed by four reflective panels. Persons of ordinary skill in the art will understand that an optical apparatus having a reflective enclosure formed by three, five, six, seven, eight or more reflective panels to define an optical apparatus having a cross-section that is a polygon such as a triangle, a square, a rectangle, a pentagon, and a hexagon (see FIGS. 11a-11c) is likewise intended to be within the principles and scope of the subject matter described herein.

FIGS. 12(a)-(f) and 13(a)-(d) shows examples of regular and non-regular polygon shaped optical homogenizer embodiments. For convenience the central gearing has been omitted in the figures. The figures show that it is not necessary for all the sides of the optical apparatus to be of the same length and/or that all the angles of the optical apparatus need to be equal in magnitude. For example, in a rectangular shaped homogenizer, the motion of all the sides is equal in magnitude and a single circular gear may be used. If the angles are different in magnitude then the magnitude of the motions of the various sides is also unequal. In an embodiment having non-uniform motion and non-uniform angles a plurality of gears are generally required to impart motion. If more than one gear is used, the gears need not be fixed to each other, but the gear should move in a coordinated effort to adjust the size of the optical apparatus.

Figure 1:
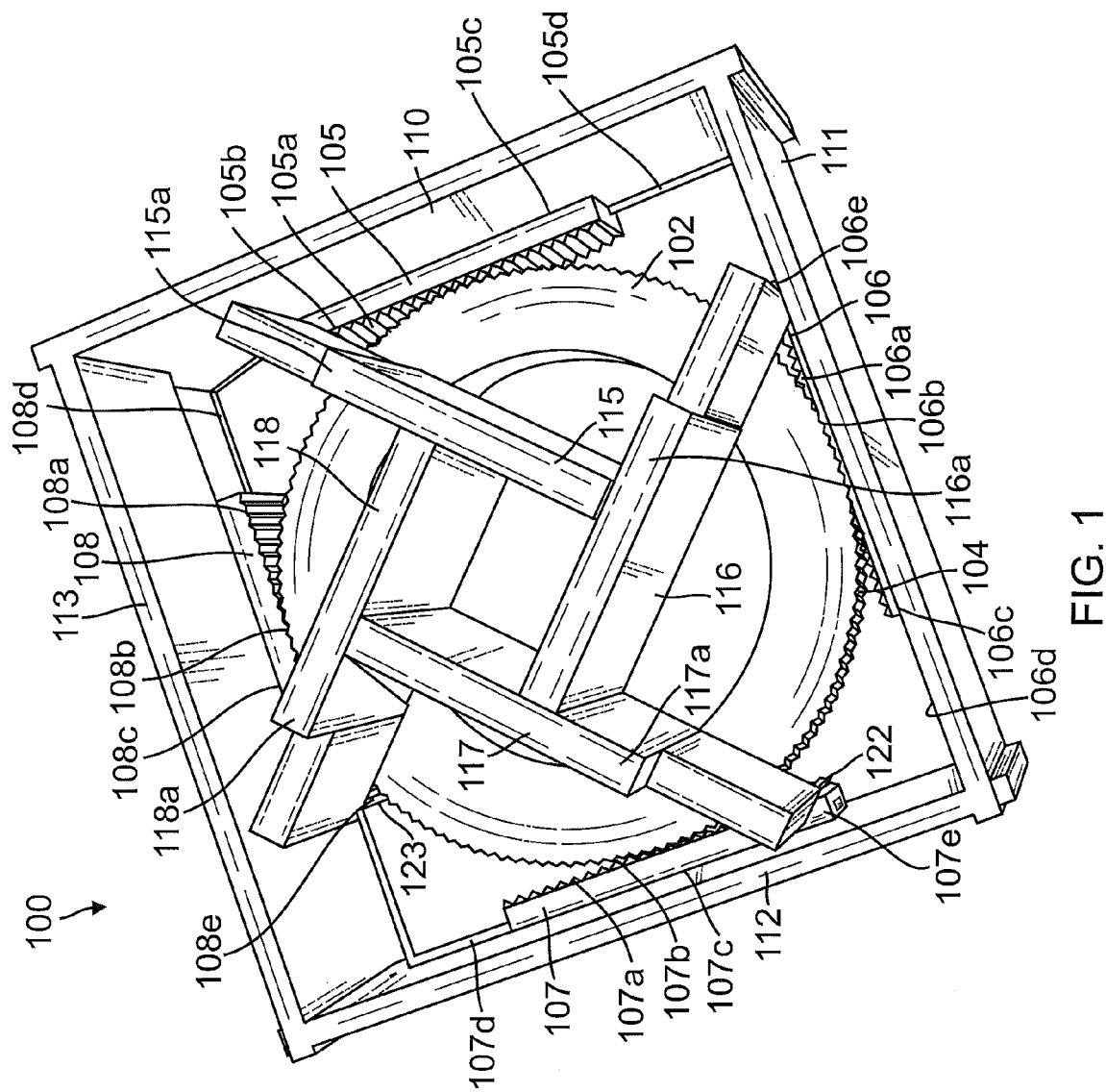
FIG. 1 shows a top perspective view of a variable sized optical apparatus for receiving one or more optical beams and for producing different sized substantially uniform beam outputs in accordance with one embodiment.

FIG. 1 shows a top perspective view of a variable sized optical apparatus for receiving an optical beam and for producing a plurality of different sized substantially uniform beam outputs. One embodiment of the variable sized optical apparatus 100 includes a central gear 102 having a circular shape and further including a plurality of outwardly extending teeth 104 positioned along the perimeter of the central gear 102. The optical apparatus 100 further includes a first linear gear 105, a second linear gear 106, a third linear gear 107, and a fourth linear gear 108 each movably attached to a corresponding one of a first through fourth sidewall 110-113 of the optical apparatus 100. Each of the first through fourth linear gears 105-108 include a plurality of corresponding outwardly extending teeth 105a-108a positioned along a corresponding first surface 105b-108b for engaging the corresponding teeth 104 of the central gear 102 to move each of the first through fourth linear gears 105-108 along its corresponding sidewall 110-113 upon rotation of the central gear 102. The combination of the central gear 102 and the first through fourth linear gears 105-108 may be considered collectively as a drive mechanism 109 (see FIG. 2A) that functions much like a rack and pinion. In this regard, at least two gears convert rotational motion into linear motion. The central gear 102 (circular pinion) engages teeth on the four linear gears 105-108 (flat racks) such that rotational motion applied to the central gear 102 will cause the four linear gears 105-108 to move to the side, up to their limit of travel.

In this regard, in one embodiment, each of the first through fourth linear gears 105-108 may include a grooved second surface 105c-108c opposite the respective first surfaces 105a-108a. The second surfaces 105c-108c configured to mate with a corresponding guide rail 105d-108d formed in the corresponding sidewall 110-113 of each linear gear 105-108 to permit movement of the linear gears 105-108 back-and-forth along its corresponding sidewall 110-113. In this regard, a first end 107e of linear gear 107 is shown in FIG. 1 without its corresponding guide rail formed along sidewall 112 for illustrating the formed groove in the second surface 107c of linear gear 107. Persons of ordinary skill in the art will understand that similar grooves although not explicitly shown are understood to exist in the other linear gears 105, 106, and 108.

Figure 2:
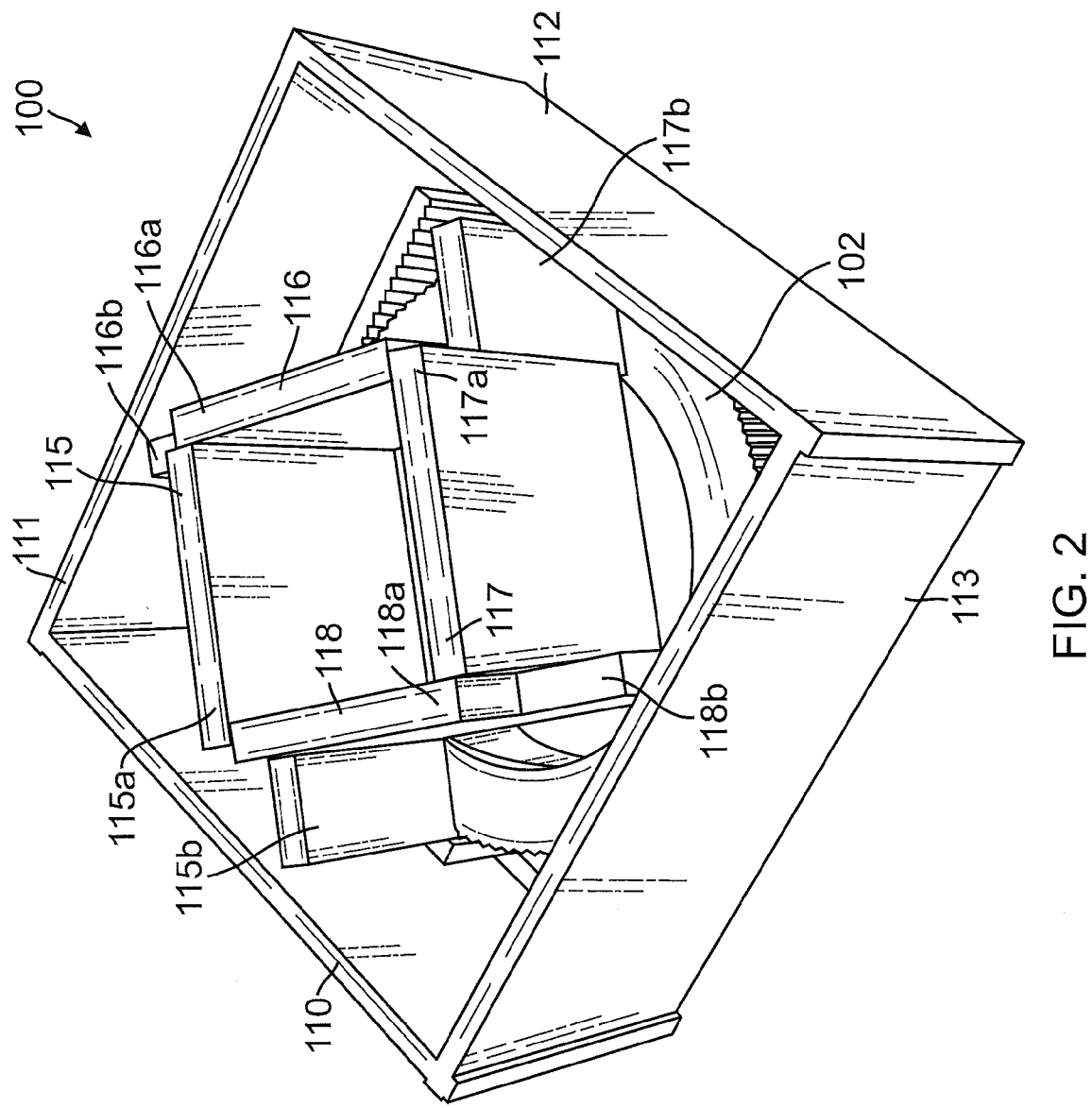
FIG. 2 is a perspective view of the variable sized optical apparatus of FIG. 1 showing the apparatus sized to produce a substantially uniform beam output.
Figure 2A:
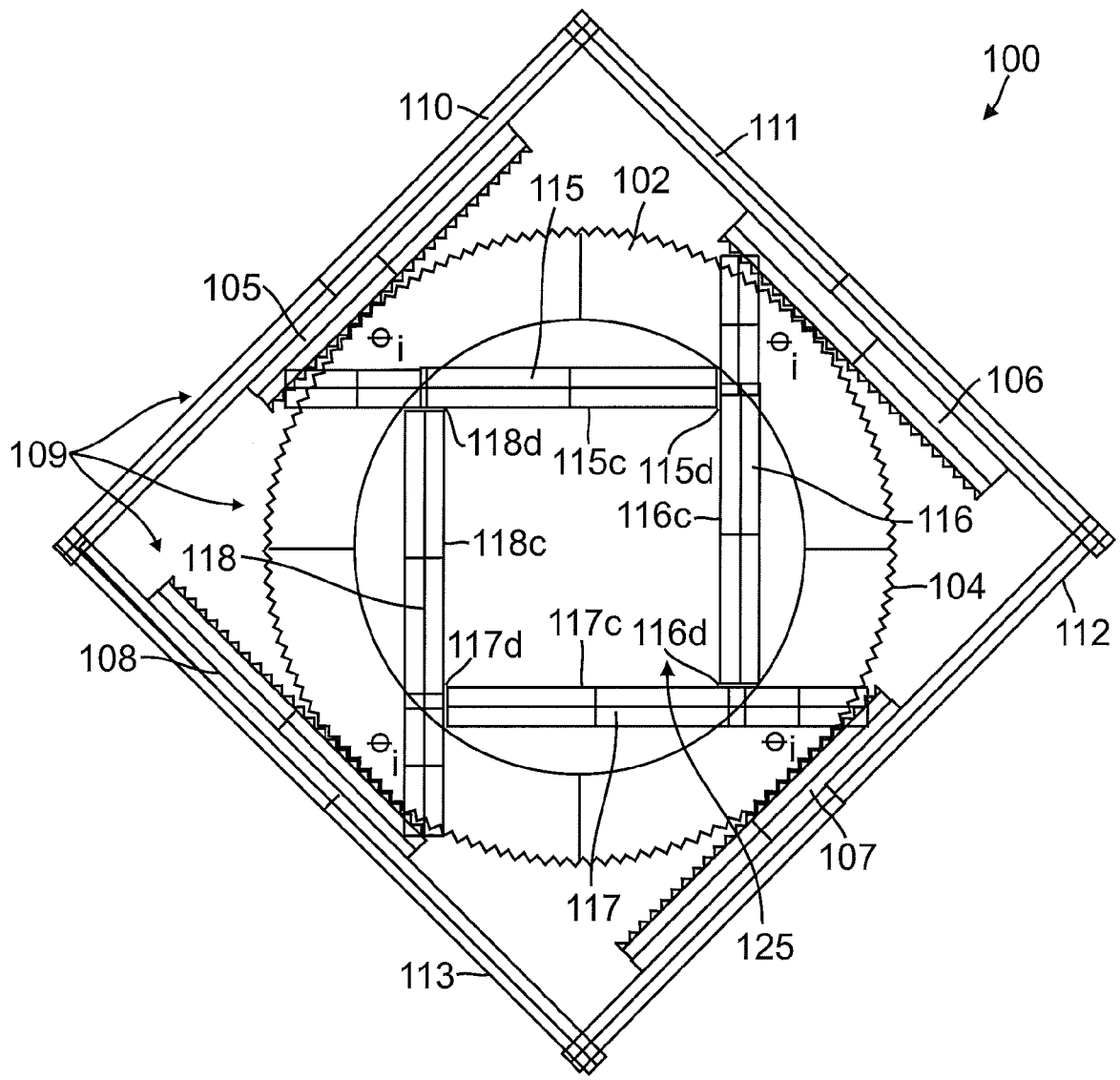
FIG. 2A is a schematic representation of the variable sized optical apparatus of FIG. 2.
Figure 3:
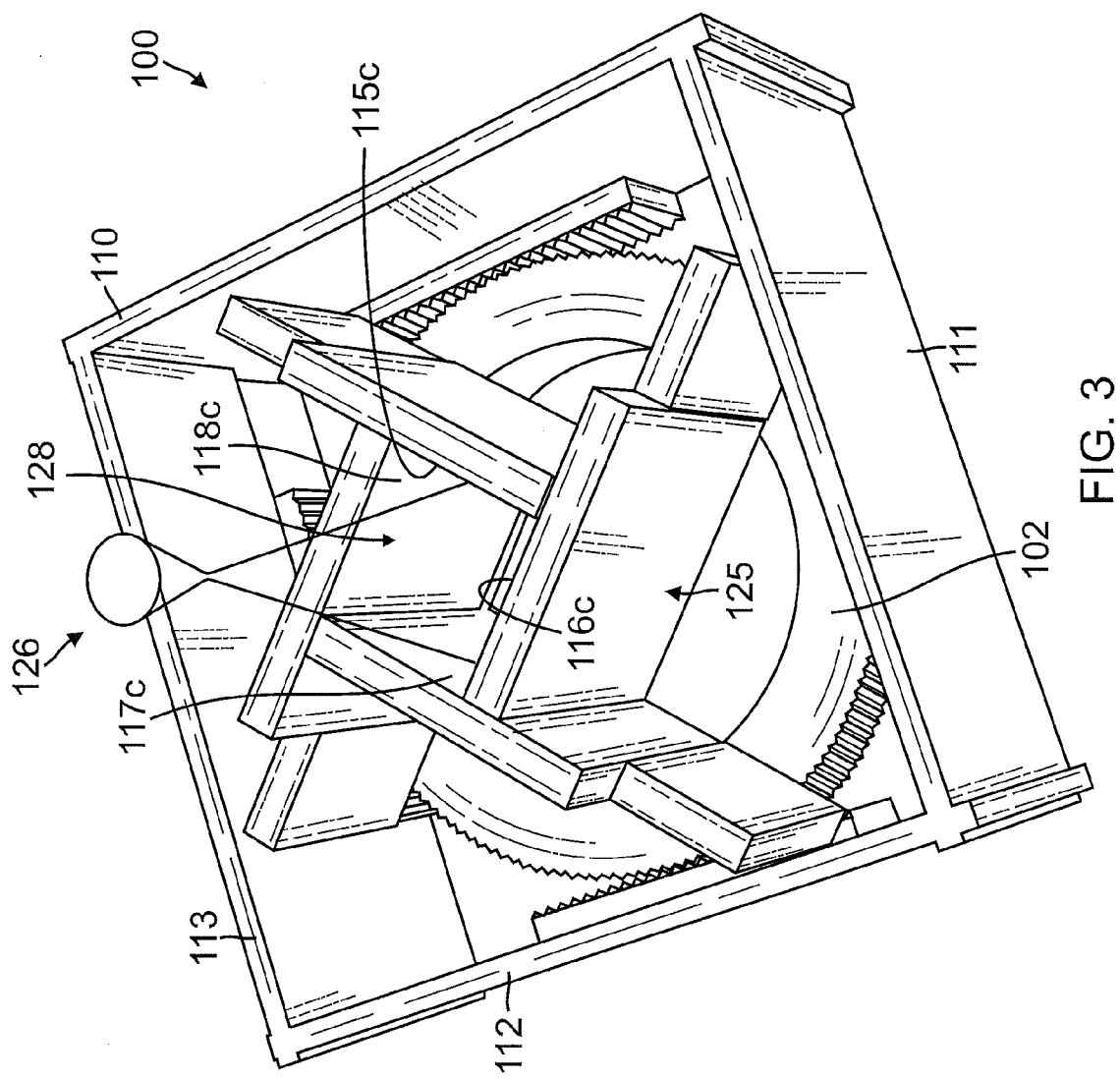
FIG. 3 shows a perspective view of the variable sized optical apparatus of FIG. 1 showing the apparatus sized to produce a substantially uniform beam output that is smaller than the substantially uniform output beam produced by the variable sized optical apparatus of FIG. 2 while maintaining the same total throughput power.
Figure 3A:
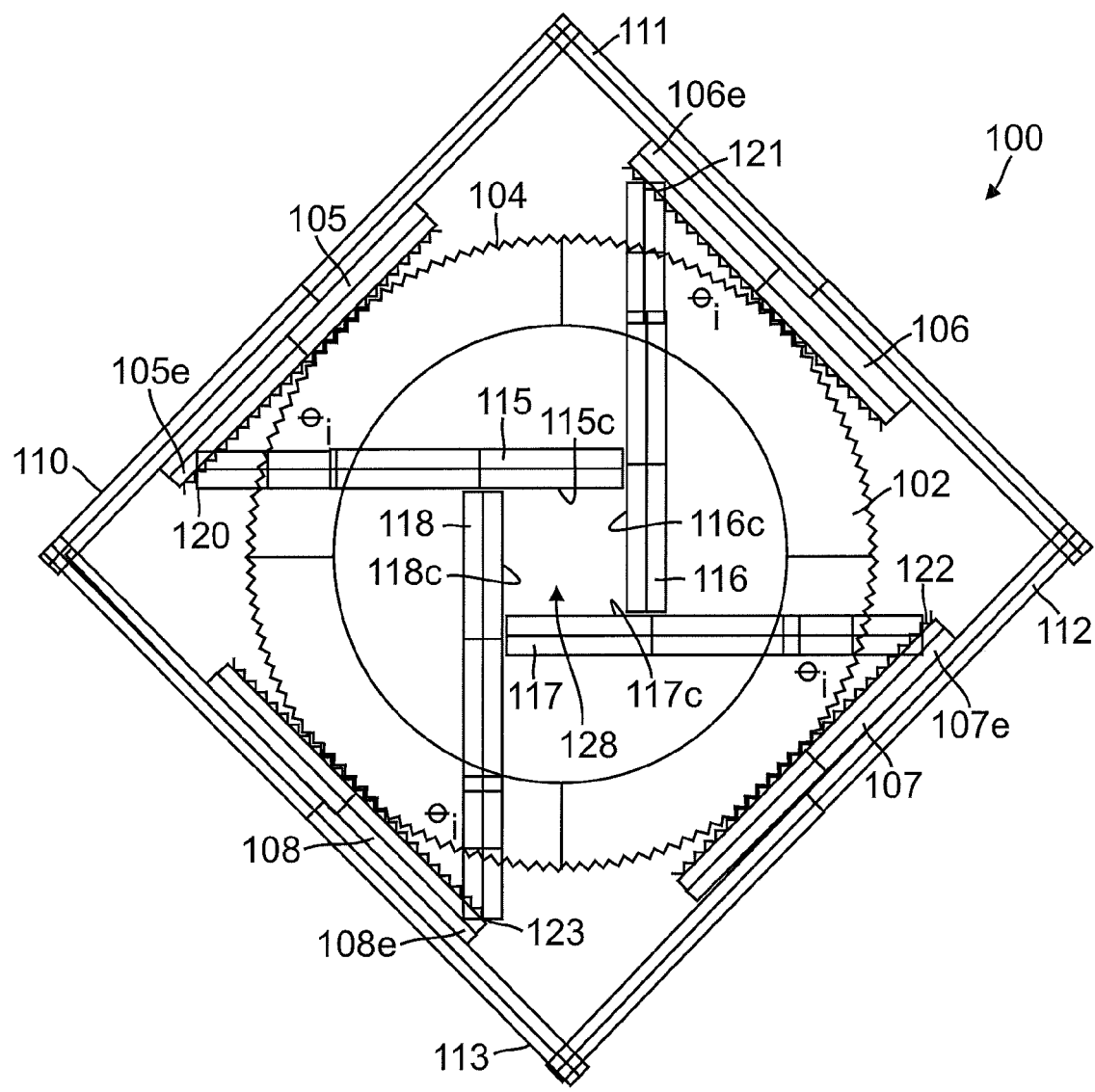
FIG. 3A is a schematic representation of the variable sized optical apparatus of FIG. 3.

The optical apparatus 100 further includes a first reflective panel 115, a second reflective panel 116, a third reflective panel 117, and a fourth reflective panel 118 each connected directly along a first end 115a-118a of the respective reflective panels 115-118 to a first end 105e-108e of one of the first through fourth linear gears 105-108 via a linkage, post, or similar connecting means 120-123 so that each of the first through fourth reflective panels 115-118 are positioned at a fixed angle $\theta_i$ relative to its corresponding linear gear 105-108, as shown in FIGS. 2A and 3A. Alternatively, each of the first through fourth reflective panels 115-118 may be connected indirectly to the linkages 120-123 through the use of a corresponding extension member 115b-118b connected from the first end 115a-118a of the respective reflective panels 115-118 to the first end 105e-108e of one of the first through fourth linear gears 105-108. The reflective panels 115-118 are positioned above the central gear 102 to permit movement of the reflective panels 115-118 with their corresponding linear gear 105-108 as the linear gears 105-108 move in response to the movement of the central gear 102.

As shown in FIG. 3, in one embodiment each of the first through fourth reflective panels 115-118 include a mirrored surface 115c-118c or similar type of highly reflective surface for reflecting an optical beam 126. In this regard, each of the mirrored surfaces 115c-118c may include a broadband coating such as silver, aluminum, or gold for example, to allow the optical apparatus 100 to be used over a wide range of optical wavelengths. For example, an aluminum coating may be used to allow the optical apparatus 100 to effectively reflect wavelengths from the ultra-violet (UV) spectrum to the infra-red (IR) spectrum. Furthermore, as light is not permitted to pass through the mirrored surfaces 115c-118c, power densities used with the optical apparatus 100 may be quite high relative to other panel constructions as described below.

Figure 7:
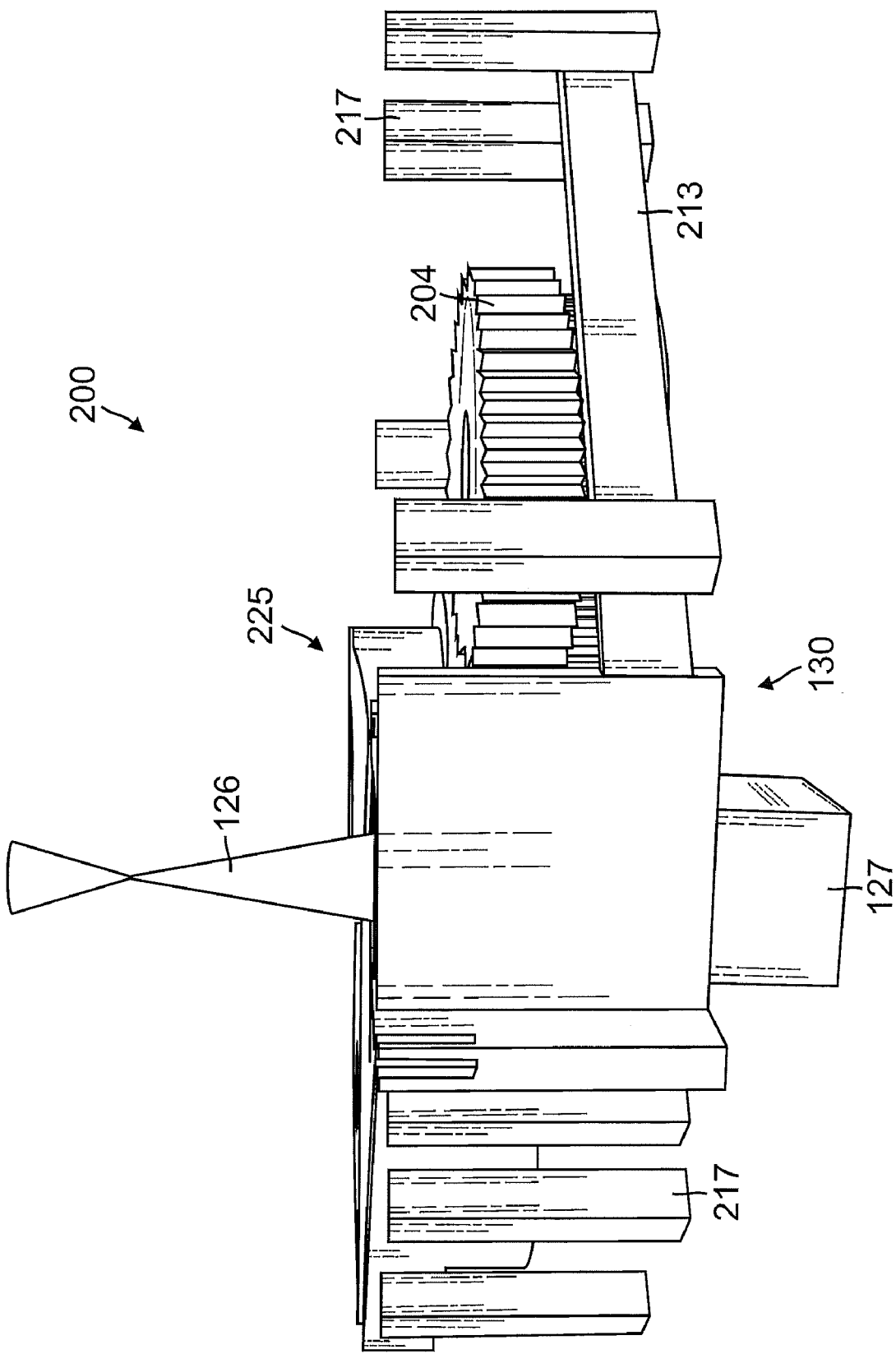
FIG. 7 shows another side perspective view of a variable sized optical apparatus of FIG. 4.

The reflective panels 115-118 are positioned adjacent to each other with the mirrored surfaces 115c-118c arranged to face each other to form a reflective enclosure or homogenizer chamber 125 for reflecting the optical beam 126 directed toward an interior portion 128 of the reflective enclosure 125 and producing a substantially uniform optical beam 127 at an output 130 (see FIG. 7) of the reflective enclosure 125. As shown in FIG. 7, the optical beam 127 at the output 130 of the reflective enclosure may include a substantially uniform "top-hat" beam irradiance pattern.

As shown in comparing FIGS. 2, 2A, 3, and 3A, the optical apparatus 100 is configured to permit the reflective enclosure 125 formed by the mirrored surfaces 115c-118c to be resized to produce different size optical beams at the output 130. In this regard, as indicated above, the optical apparatus 100 includes first through fourth reflective panels 115-118 each connected along the first end 115a-118a of the respective reflective panels 115-118 to the first end 105e-108e of one of the first through fourth linear gears 105-108 via a linkage 120-123 so that each of the first through reflective panels 115-118 are positioned at an angle $\theta_i$ relative to its corresponding linear gear 105-108. Note that the $\theta_i$ values for the four reflective panes 115-118 need not to be the same; e.g., the reflective enclosure 125 may be a trapezoidal shape, a diamond shape, or some other general shape. As the central gear 102 is rotated in either a clockwise or counterclockwise direction the plurality of teeth 104 along the perimeter of the central gear 102 mate or engage with corresponding teeth 105a-108a positioned along the first surface 105b-108b of each of the linear gears 105-108 to drive each of the linear gears 105-108 back-and-forth along its corresponding sidewall 110-113.

As each of the linear gears 105-108 is moved along its corresponding sidewall 110-113 each of the attached first through fourth reflective panels 115-118 are moved accordingly either in a first direction or a second direction at a preset angle relative to the linear gears 105-108 for any given reflective enclosure shape to change the size of the reflective enclosure 125. As shown in FIGS. 2 and 2A, the size of the reflective enclosure 125 is increased when the central gear 102 is rotated in a counterclockwise direction. As shown in FIGS. 3 and 3A, the size of the reflective enclosure 125 is decreased when the central gear 102 is rotated in a clockwise direction.

Although the angles $\theta_i$ measured between each of the first through fourth reflective panels 115-118 and their corresponding linear gears 105-108 within a particular instance of an optical apparatus 100 will be constant as the device is adjusted for different beam sizes, the angles $\theta_i$ measurement from one instance of an optical apparatus to another optical apparatus may differ. Also the angles may vary depending upon the size for the optical apparatus. In this regard, constant angles $\theta_i$ within a particular instance of the optical apparatus ensures proper alignment of the reflective panels 115-118 relative to each other when adjusting the size of the reflective enclosure 125, while different measurements of angles $\theta_i$ between optical devices simply means that the optical devices will have different shape output beams or they will be physically larger or smaller relative to each other. The linkages 120-123 may be rotatable to permit the angles $\theta_i$ to be changed to alter the size, shape, or other characteristics of the optical apparatus from one application to another.

The reflective enclosure 125 includes a clearance between a second end 115d-118d of each the of the reflective panels 115-118 (positioned opposite the first end 115a-118a) and each of the mirrored surfaces 115c-118c, in which the second end 115d-118d is associated with in forming the reflective enclosure 125, to permit the reflective panels 115-118 to move relative to one another without damaging (scratching or otherwise marring the surface) the mirrored surfaces 115c-118c. In this regard, since the drive mechanism 109 moves the first through fourth reflective panels 115-118 at the same rate and each of the reflective panels 115-118 is rigidly attached to its companion linear gear 105-108 so that they move together, each of the clearances between the second end 115d-118d of each of the reflective panels 115-118 and each of the mirrored surfaces 115c-118c are maintained when adjusting (enlarging or reducing) the size of the reflective enclosure 125.

For example, as shown in FIG. 2A, a clearance exists between reflective panel 115 and mirrored surface 116c, reflective panel 116 and mirrored surface 117c, reflective panel 117 and mirrored surface 118c, and reflective panel 118 and mirrored panel 115c. Accordingly, in this manner the optical apparatus 100 allows adjustment of the reflective enclosure 125 over a continuous range of sizes to change the size of the optical beam 126 at the output 130 of the optical apparatus 100 thus obviating the need to continually replace one optical device having only a single fixed beam output with another optical device having a different fixed beam output in order to obtain a range of different sized optical beams outputs.

Although not shown, the central gear 102 may include a knob or handle to facilitate rotation of the central gear 102 and size adjustment of the reflective enclosure 125. The central gear 102 and/or other structure(s) of the optical apparatus 100 may include a scale or similar device (not shown) having demarcations to indicate the size of the interior portion 128 of the reflective enclosure 125, movement of the reflective panels 115-118, and/or the degree of rotation of the central gear 102 to provide visual feedback in the way of measurements associated with the size adjustment of the reflective enclosure 125 and/or beam size at the output of the optical apparatus 125.

In contrast to optical devices that are capable of providing only a single fixed beam output and that utilize solid catadioptric elements, i.e., elements having transmissive and reflective properties, that may spread the spectral content of the light beam non-uniformly due to the dispersion, the subject matter disclosed herein according to one embodiment is a totally reflective optical apparatus that provides a range of different sized optical beams at the output of the device over a broad range of wavelengths without having any effect on the dispersion of the beam.

Optical devices that use a solid transmissive enclosure are limited in their power density handling capabilities as an optical beam having too high an irradiance value (power/unit area) may damage or break the transmissive material; whereas the optical apparatus according to one embodiment described herein does not include transmissive elements so that beams having a relatively high irradiance valves may be used with the device. Furthermore, solid transmissive optical devices require the angles between reflective surfaces to be well-controlled during manufacture in order to ensure the uniformity of the beam output, whereas the optical apparatus according to one embodiment described herein provides for realignment or adjustment of the reflective surfaces as needed to ensure the uniformity the beam output.

Finally, since no external aperture is needed with the optical apparatus described herein, most, if not all, of the optical beam that enters the optical apparatus is present in the usable output beam such that the total power in the resultant beam is maintained. For small output beams this means that the output irradiance is increased. A neutral density filter may be utilized in the beam train if the irradiance is too high. However, in this regard, it is generally considered more desirable to have too much power that can be reduced than to have too little power that can not be increased if needed.

Figure 4:
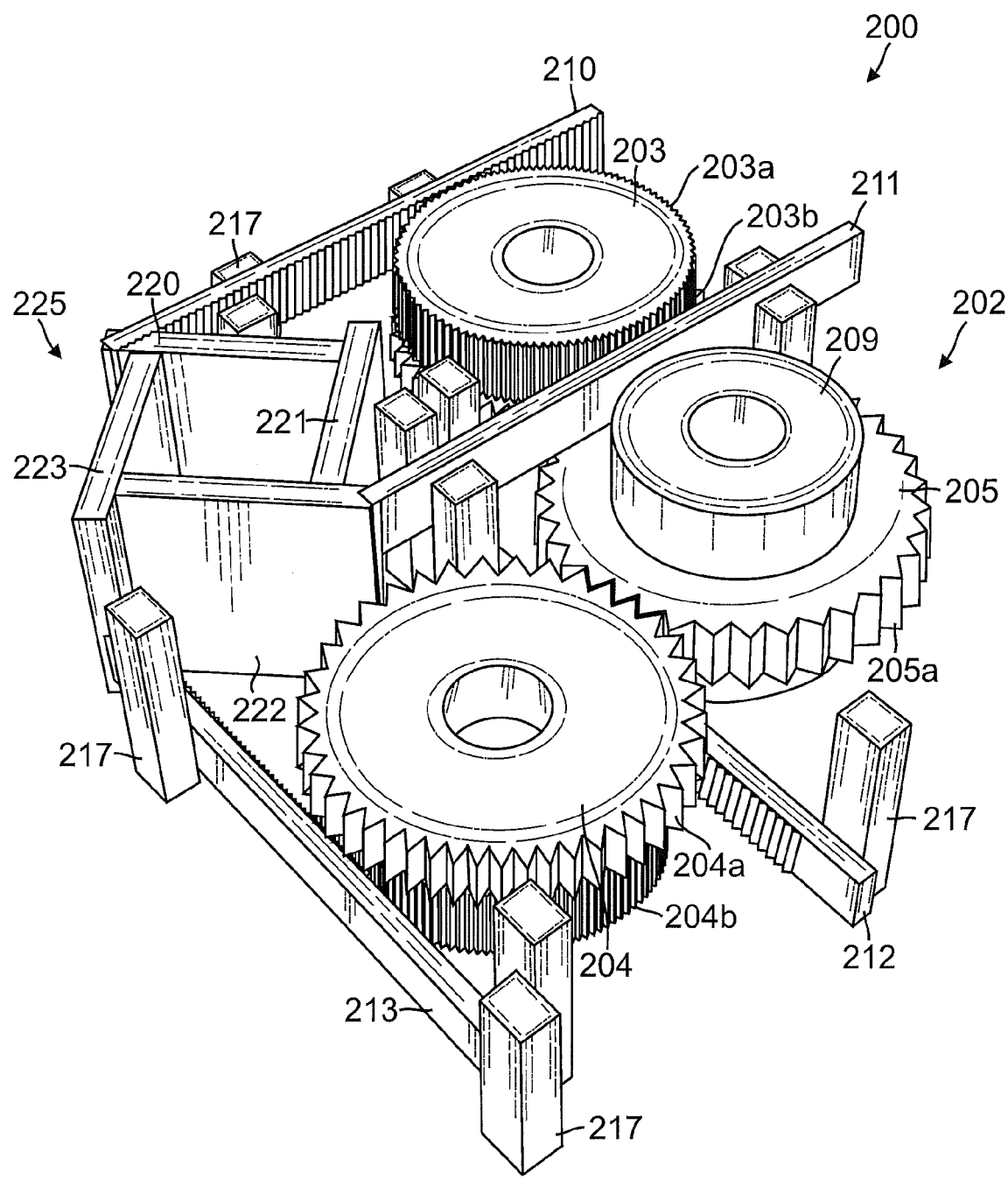
FIG. 4 shows a perspective view of a variable sized optical apparatus for receiving one or more optical beams and for producing different sized substantially uniform beam outputs in accordance with another embodiment.
Figure 5:
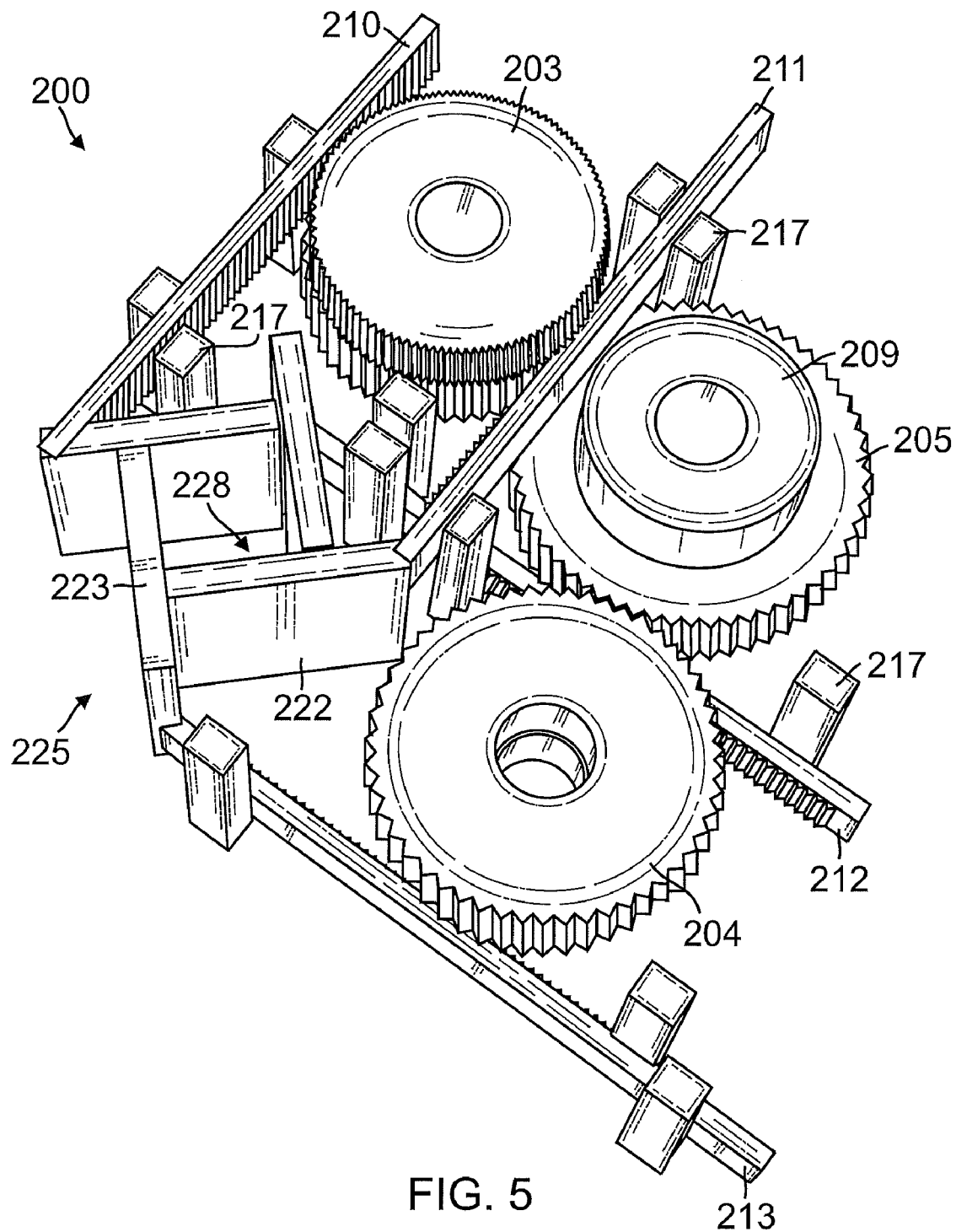
FIG. 5 shows a top perspective view of a variable sized optical apparatus of FIG. 4.
Figure 6:
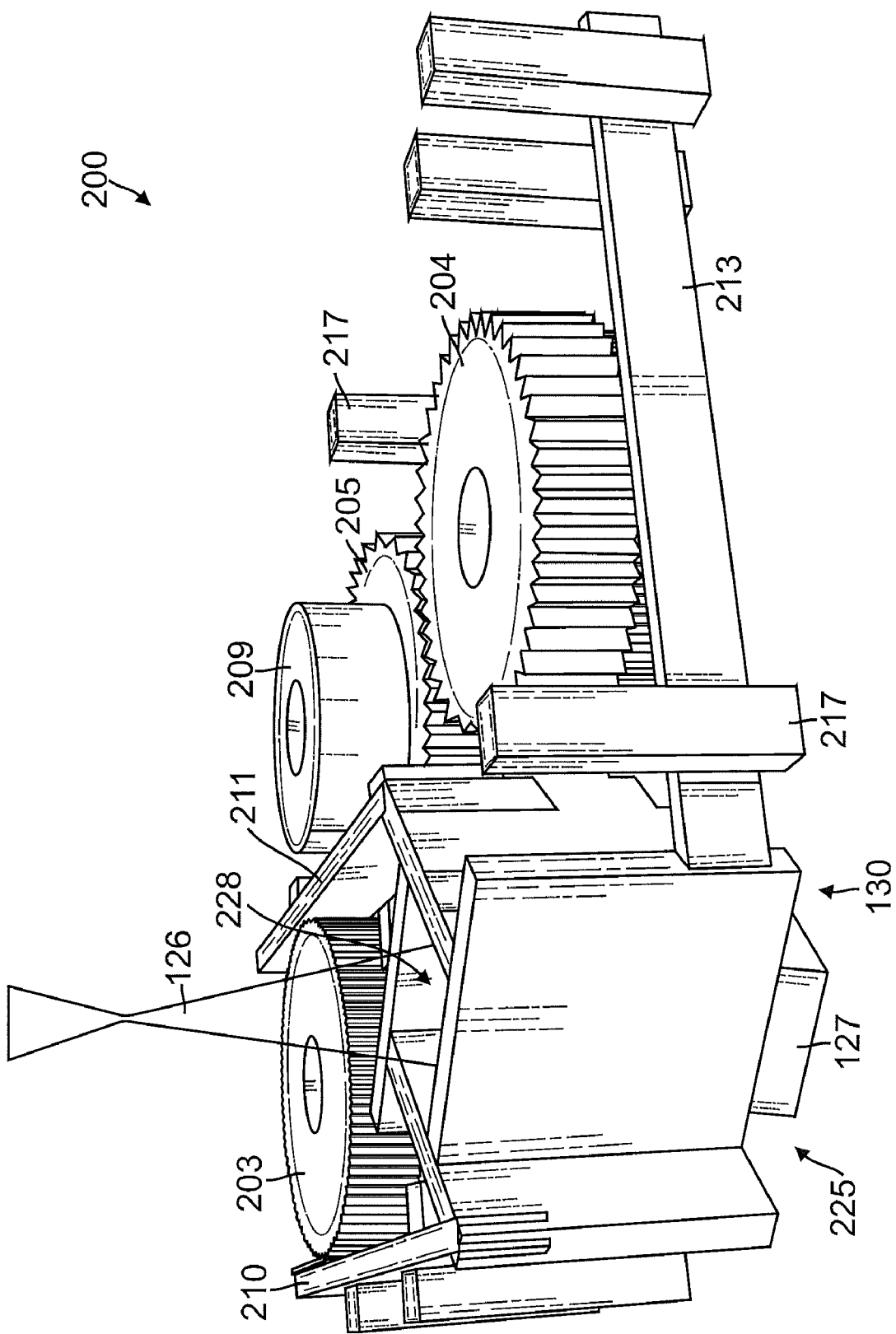
FIG. 6 shows a side perspective view of a variable sized optical apparatus of FIG. 4.

FIG. 4 shows a perspective view of a variable sized optical apparatus for receiving an optical beam and for producing a plurality of different sized substantially uniform beam outputs in accordance with another embodiment. As shown in FIG. 4 the optical apparatus 200 includes a drive mechanism 202 that includes a first circular gear 203 having a plurality of outwardly extending teeth 203a positioned around the top perimeter of the gear 203 and a plurality of outwardly extending teeth 203b positioned around the bottom perimeter of the gear 203, a second circular gear 204 having a plurality of outwardly extending teeth 204a positioned around the top perimeter of the gear 204 and a plurality of outwardly extending teeth 204b positioned around the bottom perimeter of the gear 204, and a third circular gear 205 including a plurality of outwardly extending teeth 205a positioned about the perimeter of the gear 205.

Figure 8:
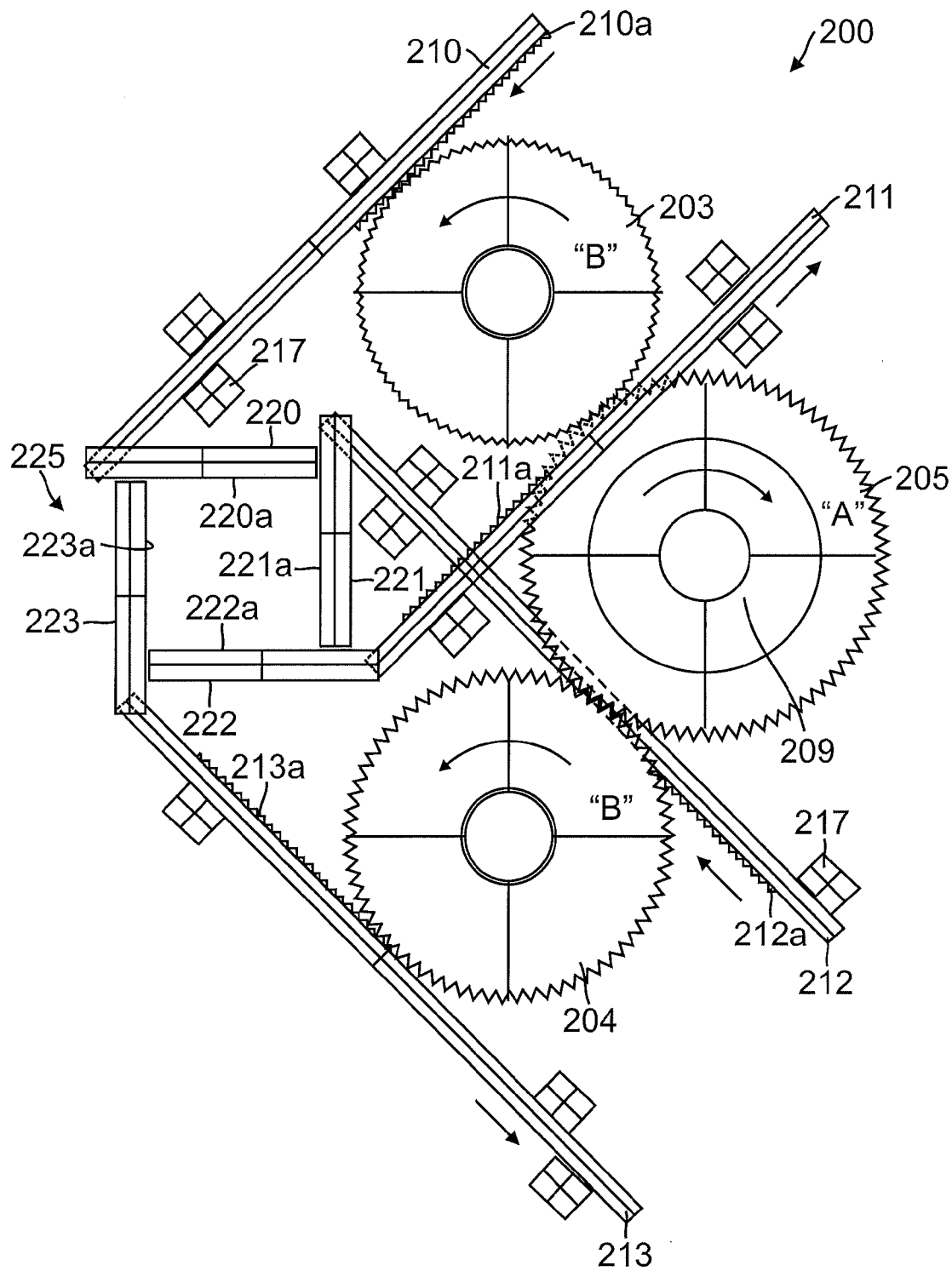
FIGS. 8-10 show schematic representations of the variable sized optical apparatus of FIG. 4 adjusted to produce different sized beam outputs.

The third circular gear 205 is positioned so that the teeth 205a of the third circular gear 205 rotatably engage the bottom teeth 203b of the first circular gear 203 and the top teeth 204a of the second circular gear 204 such that rotation of the third circular gear 205 causes the first circular gear 203 and the second circular gear 204 to rotate. As shown in FIG. 8, rotation of the third circular gear 205 via a knob or similar mechanism 209 in a clockwise direction, as indicated by arrow "A", causes the first and second circular gears 203, 204 to rotate in a counterclockwise direction, as indicated by arrows "B".

As further shown in FIG. 4, the optical apparatus 200 further includes a first linear gear 210, a second linear gear 211, a third linear gear 212, and a fourth linear gear 213. Each of the first through fourth linear gears 210-213 includes outwardly extending teeth 210a-213a along a first surface for operably engaging corresponding teeth of one of the first and second circular gears 203, 204. In this regard, the first and second linear gears 210, 211 are operably connected to the top teeth 203a of the first circular gear 203. While the third and fourth linear gears 212, 213 are operably connected to the bottom teeth 204b of the second circular gear 204.

As indicated above, when the third circular gear 205 is rotated in a clockwise direction the first and second circular gears 203, 204 rotate in a counterclockwise direction. As the first circular gear 203 moves in the counterclockwise direction the first circular gear 203 causes the first linear gear 210 and second linear gear 211 to move as indicated by the directional arrows shown in FIG. 8 associated with each of those linear gears 210, 211. Likewise, when the second circular gear 204 moves in the counterclockwise direction the second circular gear 204 causes the third linear gear 212 and the fourth linear gear 213 to move as indicated by the directional arrows shown in FIG. 8 associated with each of those linear gears 212, 213. Accordingly, similar to the optical apparatus 100 embodiment shown in FIG. 1, the optical apparatus 200 of FIG. 4 includes a drive mechanism 202 that functions to some degree much like a rack and pinion. The optical apparatus 200 may further include a plurality of guide posts, linear gear tracks, or other suitable device 217 or method positioned to ensure that the linear gears 210-213 travel in a straight line.

Persons of ordinary skill in the art will understand that the arrangement, connections, and operability of the optical apparatus 200 described in FIG. 4 and other associated figures is shown for illustrative purposes only and that many variations of the drive mechanism 202 structure are intended to be included within the scope of the disclosed subject matter. For example, each of the gears 203-205 may include a single row of teeth that operably engage two linear gears simultaneously and none of the other gears. In this regard, the first circular gear 203 may operably engage the first and second linear gears 210, 211. The second circular gear 204 would operably engage the third and fourth linear gears 212, 213. While the third circular gear 205 would operably engage the second and third linear gears 211, 213.

In another example, a belt drive may be used to drive the circular gears 203-205 while the linear gears 210-213 are driven as described above. Similar to the optical apparatus 100 shown in at least FIG. 1, the optical apparatus 200 shown in FIGS. 4-10 further includes a first reflective panel 220, a second reflective panel 221, a third reflective panel 222, and a fourth reflective panel 223 each connected directly or indirectly to a corresponding one of the first through fourth linear gears 210-213 so that each of the first through fourth reflective panels 220-223 are positioned at an angle $\theta_i$ relative to its corresponding linear gear 210-213, see at least FIG. 9. For example, the angle $\theta_i$ between the first and second reflective panels 220 and 221 and their corresponding linear gears 210, 211 may be the same, while the angle $\theta_i$ between the third and fourth reflective panels 222, 223 and their corresponding gears 211, 213 may be the same, but different than the angle $\theta_i$ of the first and second reflective panels 220 and 221 and corresponding linear gears 210, 211.

For efficiency, the further structure, configuration, and operative relationship of the first through forth reflective panels 220-223 and the first through fourth linear gears 210-213 of the embodiment of the optical apparatus 200 shown in FIG. 4 is substantially similar to the embodiment of the optical apparatus 100 shown in FIG. 1 and will therefore be summarized below. The first through fourth reflective panels 220-223 include a mirrored surface 220a-223a or similar type of highly reflective surface having a broadband coating for reflecting an optical beam 126 (see FIG. 7). The mirrored surfaces 220a-223a are arranged to face each other to form a reflective enclosure 225 for reflecting the optical beam 126 directed toward an interior portion 228 of the reflective enclosure 225 and producing a uniform "top-hat" optical beam 127 irradiance pattern at an output 130 of the optical apparatus 200.

Figure 9:
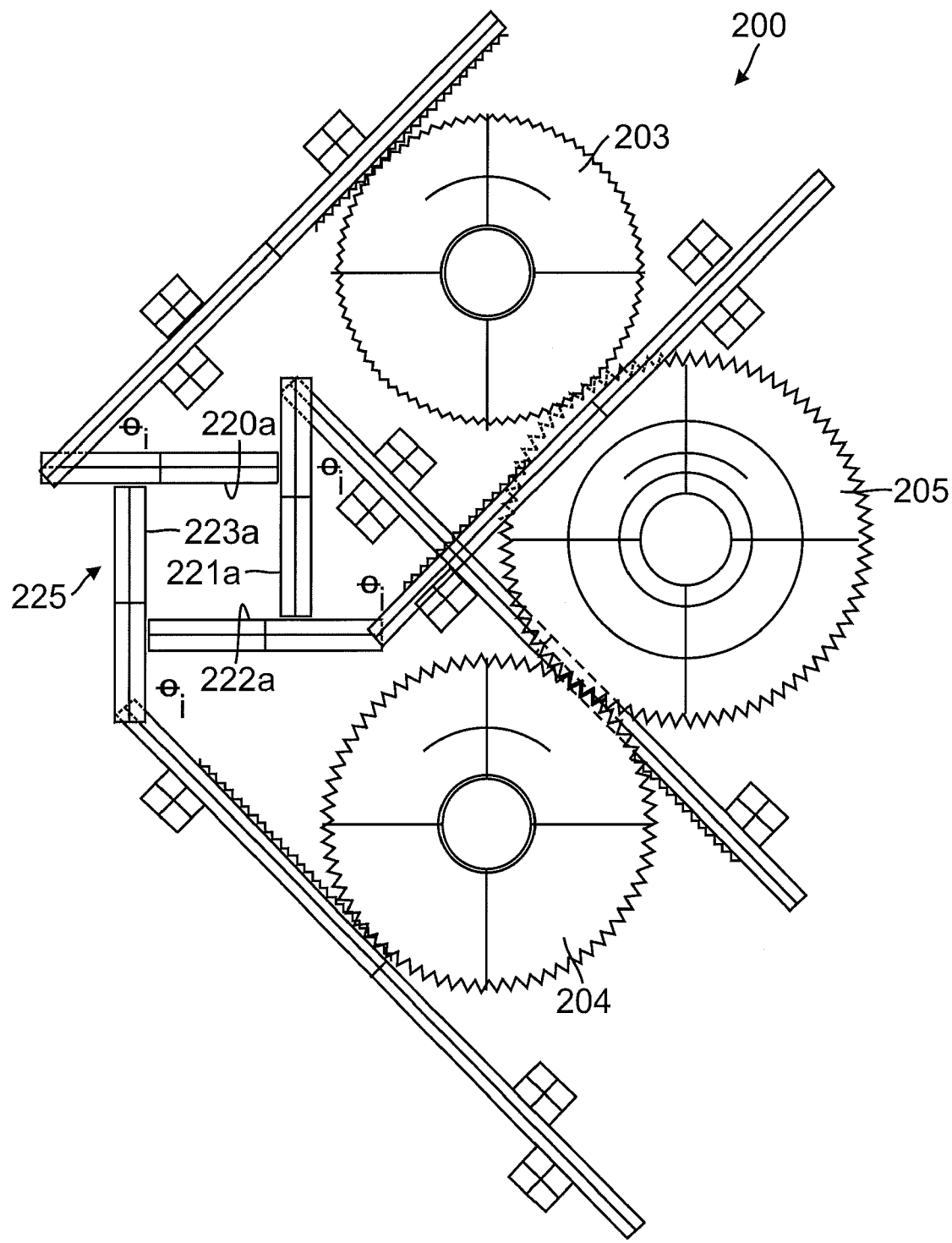
Figure 10:
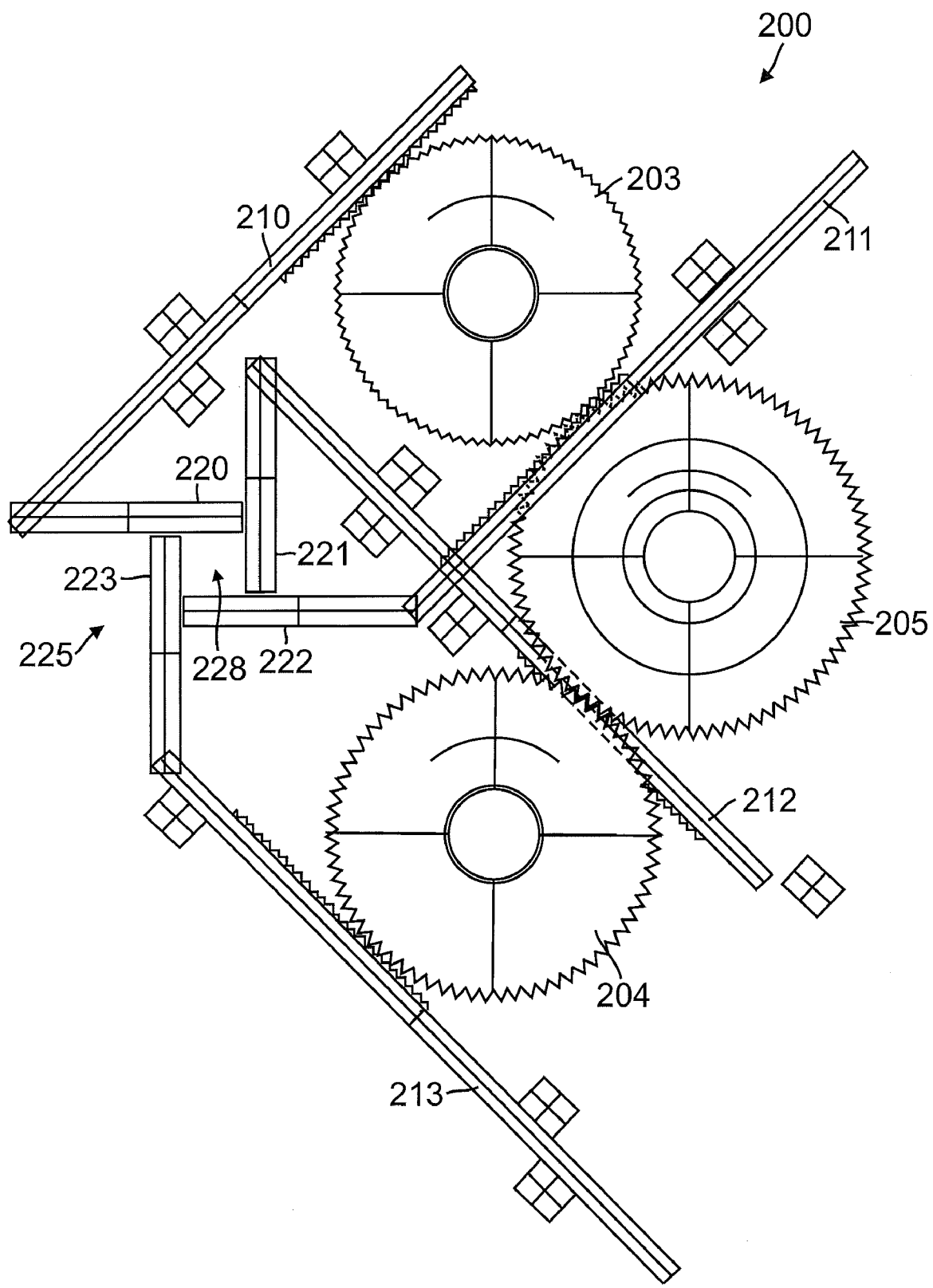

As shown in comparing FIGS. 8-10, the reflective enclosure 225 of the optical apparatus 200 is configured to permit the reflective enclosure 225 formed by the mirrored surfaces 220a-223a to be resized to produce different size optical beams at the output 130.

In this regard, as the third circular gear 205 is rotated in either a clockwise or counterclockwise direction the first and second circular gears 203, 204 as previously described. Movement of the first and second circular gears 203, 204 facilitate movement of the first through fourth linear gears 210-213 which in turn case the first through fourth reflective panels 220-223 to move accordingly at an angle relative to their corresponding linear gears 210-213 to either increase the size of the reflective enclosure 225, when the third circular gear 205 is rotated in a counterclockwise direction as shown in FIG. 8, or decrease the size of the reflective enclosure 225 when the third circular gear 205 is rotated in a clockwise direction as shown in FIG. 10.

A clearance exists between reflective panel 220 and mirrored surface 221a, reflective panel 221 and mirrored surface 222a, reflective panel 222 and mirrored surface 223a, and reflective panel 223 and mirrored panel 220a. Accordingly, in this manner the optical apparatus 200 allows adjustment of the reflective enclosure 225 over a continuous range of sizes to change the size of the optical beam 126 at the output 130 of the optical apparatus 200 thus obviating the need to continually replace one optical device having only a single fixed beam output with another optical device having a different fixed beam output in order to obtain a range of different sized optical beams outputs.

The systems and methods of various embodiments have been described with some particularity, but the specific designs, constructions, and/or steps disclosed are not to be taken as limiting. Although the method(s) are illustrated and may have been described herein as occurring in a certain order, the specific order, or any combination or interpretation of the order, is not required. Obvious modifications will make themselves apparent to those of ordinary skill in the art, all of which will not depart from the essence of disclosed subject matter, and all such changes and modifications are intended to be encompassed within the appended claims.

What is claimed is:

1. An optical beam homogenizer, comprising:
   an adjustable homogenizer chamber for selectively producing different sized homogenized output beams, wherein the homogenizer chamber is configured to receive an optical beam input, reflect the optical beam from an interior portion of the chamber, and produce an optical beam output according to the size of the chamber; and
   a drive mechanism configured to adjust the size of the homogenizer chamber to provide different sized optical beams, wherein the homogenizer chamber is formed by at least three movable reflective panels.

2. The optical beam homogenizer of claim 1, wherein a cross-section of the homogenizer chamber is a regular polygon.

3. The optical beam homogenizer of claim 2, wherein the regular polygon is one of a triangle, a square, a pentagon, and a hexagon.

4. The optical beam homogenizer of claim 1, wherein the input beam has a Gaussian profile and the output has a top-hat profile.

5. The optical beam homogenizer of claim 1, wherein each of the reflective panels includes a mirrored surface having a broadband reflective coating, and wherein the drive mechanism is operably coupled to the reflective panels to adjust the size of the homogenizer chamber.

6. The optical beam homogenizer of claim 5, wherein the drive mechanism includes at least one circular gear and a plurality of linear gears operably connected to each other such that rotation of the circular gear causes movement of the linear gears to move the reflective panels attached thereto to vary the size of the homogenizer chamber.

7. The optical beam homogenizer of claim 6, wherein the drive mechanism includes three circular gears and four linear gears, and wherein each of the reflective panels are attached to a corresponding one of the linear gears at an angle relative to the linear gear.

8. An optical beam homogenizer, comprising:
   a reflective enclosure to receive an optical beam input, reflect the optical beam from an interior portion of the enclosure, and to produce an optical beam output, the enclosure including movable reflective panels that define the interior portion of the enclosure and move relative to each other to vary a size of the enclosure to produce the optical beam output from the enclosure.

9. The optical beam homogenizer of claim 8, wherein each of the reflective panels includes a mirrored surface having a broadband reflective coating.

10. The optical beam homogenizer of claim 8, wherein the homogenizer includes at least three reflective panels.

11. The optical beam homogenizer of claim 8, wherein movement of the reflective panels increases or decreases the size of the optical beam output from the enclosure.

12. The optical beam homogenizer of claim 8, further comprising a drive mechanism operably connected to the reflective panels to move the reflective panels.

13. The optical beam homogenizer of claim 12, wherein the drive mechanism includes a combination of at least one circular gear and a plurality of linear gears operably connected to each other so that rotation of the circular gear causes movement of the linear gears to move the reflective panels attached thereto.

14. The optical beam homogenizer of claim 13, wherein the drive mechanism includes three circular gears and four linear gears.

15. The optical beam homogenizer of claim 13, wherein each of the reflective panels are attached to a corresponding one of the linear gears at an angle relative to the linear gear.

16. The homogenizer of claim 15, wherein the angle between each of the reflective panels and its corresponding linear gear is the same.

17. A method of producing different sized optical beam outputs from an optical beam homogenizer, the method comprising:
   receiving an optical beam into an interior portion of an enclosure of the homogenizer; and
   varying a size of the enclosure to produce different size optical beams from the homogenizer, wherein the enclosure is formed by positioning at least three reflective panels relative to each other to form the enclosure.

18. The method of claim 17, further comprising reflecting the optical beam from the interior portion of the homogenizer.

19. The method of claim 17, wherein the varying comprises driving at least one circular gear to drive a plurality of linear gears coupled in a corresponding fashion to the reflective panels.

20. The method of claim 17, wherein positioning the reflective panels includes angling each of the reflective panels relative to each other.

21. The method of claim 17, wherein varying the output size of the homogenizer includes adjusting the reflective panels.

22. The method of claim 17, wherein varying the output size includes engaging a drive mechanism to adjust the reflective panels.

23. The method of claim 17, wherein adjusting the reflective panels includes moving the reflective panels in a first direction to increase the output size or in a second direction to decrease the size of the optical beam outputs.

* * * * *